United States Patent
Sell et al.

(10) Patent No.: US 11,699,291 B2
(45) Date of Patent: Jul. 11, 2023

(54) ALGORITHM TRIGGERED SENSOR DATA ACQUISITION

(71) Applicant: Continental Automotive GmbH, Hannover (DE)

(72) Inventors: Martin Sell, Brighton (GB); Tengfei Yin, Brighton (GB); Kanagarajan Palaniappan, Horsham (GB)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 556 days.

(21) Appl. No.: 16/616,031

(22) PCT Filed: May 24, 2018

(86) PCT No.: PCT/EP2018/063594
§ 371 (c)(1),
(2) Date: Nov. 22, 2019

(87) PCT Pub. No.: WO2018/215576
PCT Pub. Date: Nov. 29, 2018

(65) Prior Publication Data
US 2020/0117914 A1    Apr. 16, 2020

(30) Foreign Application Priority Data
May 24, 2017  (EP) .................................... 17172728

(51) Int. Cl.
*H04L 67/12* (2022.01)
*G06V 20/56* (2022.01)
(Continued)

(52) U.S. Cl.
CPC .............. *G06V 20/56* (2022.01); *G16Y 20/10* (2020.01); *G16Y 40/10* (2020.01); *G16Y 40/35* (2020.01); *H04L 67/12* (2013.01)

(58) Field of Classification Search
CPC ......... H04L 67/12; G06F 9/451; G16Y 20/10; G16Y 40/10; G16Y 40/35; G06V 20/56
See application file for complete search history.

(56) References Cited

U.S. PATENT DOCUMENTS

| 7,481,400 B2 | 1/2009 | Appleby et al. |
| 2003/0146850 A1 | 8/2003 | Fallenstein |

(Continued)

FOREIGN PATENT DOCUMENTS

| CN | 101242984 A | 8/2008 |
| CN | 101505434 A | 8/2009 |

(Continued)

OTHER PUBLICATIONS

International Search Report of the International Searching Authority for International Application PCT/EP2018/063594, dated Aug. 27, 2018, 3 pages, European Patent Office, HV Rijswijk, Netherlands.
PCT Written Opinion of the International Searching Authority for International Application PCT/EP2018/063594, dated Aug. 27, 2018, 10 pages, European Patent Office, Munich, Germany.

(Continued)

*Primary Examiner* — Jason D Recek
(74) *Attorney, Agent, or Firm* — RatnerPrestia

(57) ABSTRACT

A computer system is provided which includes a sensor system and a processor. The sampling rate of the sensor system is not predetermined, and instead depends on the acquisition rate of the algorithm acquiring the data stream provided by the sensor system. A corresponding method is also provided.

5 Claims, 1 Drawing Sheet

(51) Int. Cl.
    *G16Y 20/10*     (2020.01)
    *G16Y 40/10*     (2020.01)
    *G16Y 40/35*     (2020.01)

(56) References Cited

U.S. PATENT DOCUMENTS

| | | |
|---|---|---|
| 2010/0030509 A1 | 2/2010 | Crain, II et al. |
| 2011/0291743 A1 | 12/2011 | Taylor |
| 2014/0135612 A1 | 5/2014 | Yuen et al. |
| 2015/0350329 A1* | 12/2015 | Kolli ................. H04L 69/28 709/217 |
| 2016/0209236 A1* | 7/2016 | Steinhardt ............ G01C 21/165 |
| 2016/0349930 A1 | 12/2016 | Hazanovich et al. |
| 2017/0039084 A1 | 2/2017 | Atsmon et al. |

FOREIGN PATENT DOCUMENTS

| | | |
|---|---|---|
| JP | 10308000 A | 11/1998 |
| JP | 2005167528 A | 6/2005 |

OTHER PUBLICATIONS

Extended European Search Report and Examination Report for European Patent Application No. 17172728.2, dated Dec. 1, 2017, 10 pages, European Patent Office, Munich, Germany.
Japanese Notice of Reasons for Refusal for Japanese Application No. 2019-543358, dated May 11, 2022, with translation, 10 pages.
Japanese Office Action for Application No. 2019-543358, dated Oct. 31, 2022 with translation, 7 pages.
Chinese Office Action for Chinese Application No. 201880021045.3, dated Feb. 23, 2023 with translation, 13 pages.

\* cited by examiner

ALGORITHM TRIGGERED SENSOR DATA ACQUISITION

CROSS REFERENCE TO RELATED APPLICATIONS

This application is the U.S. National Phase Application of PCT International Application No. PCT/EP2018/063594, filed May 24, 2018, which claims priority to European Patent Application No. 17172728.2, filed May 24, 2017, the contents of such applications being incorporated by reference herein.

FIELD OF THE INVENTION

The invention relates to a method for acquiring the data provided by a sensor system where the status of the algorithm triggers the acquisition of the sensor data and a computer system executing said method.

BACKGROUND

Digital camera image recording is currently performed at a static frame rate. Each frame is converted into a data token, thereby providing a data stream to the processor consisting of discrete date tokens. At the same time algorithms for acquiring the data tokens of the data stream will have an acquisition rate that is basically independent of the frame rate. This acquisition rate will, for example, depend from the way the algorithm has been coded and the speed of the processor on which the algorithm is run.

As a consequence it is likely that the following two situations occur: A) The algorithm can be faster than the camera, forcing the algorithm to remain idle until the next frame is provided by the sensor. B) The algorithm is slower than the camera and as a consequence a frame which is "old" (up to 1/framerate old) will be processed and after this processing step the algorithm has to wait for the next frame. In order not to lose frames the frames not yet processed need to be buffered, for example, in a memory of the system. Accordingly, not all resources available for the processing of the frames are used, thereby wasting processing capacities or the most-up-to date information is not processed.

Previous solutions to this problem usually attempt to optimize the usage of the computer memory which is utilized to buffer the frames or to optimize the processing time that is allocated to the algorithm.

SUMMARY OF THE INVENTION

Accordingly, aspects of the invention are a computer system and method that optimizes the interaction of a processor and a sensor system that omits the requirement of extensive memory or processor capacity usage.

Accordingly, in a first aspect of the invention, a computer system is provided comprising:
a sensor system configured to acquire a stream of signals from the environment at a sampling rate thereby providing a data stream consisting of data tokens each token corresponding to an acquired signal of the stream of signals;
a processor configured to execute an algorithm for continuously acquiring the data stream consisting of data tokens, wherein the algorithm has an acquisition rate for acquiring the data tokens of the data stream;
wherein the processor is configured to provide instructions to the sensor system to adapt the sampling rate to the acquisition rate of the algorithm.

Since the sensor system is only trigged to acquire a further signal when the algorithm is ready, the sampling rate of the sensor system and the acquisition rate of the processor are synchronized and the above described time delay are avoided.

According to an aspect of the invention the algorithm has three different states, a first status indicating that the algorithm is ready to acquire a signal of the stream of signals and a second status indicating that the algorithm is not ready to acquire a signal of the stream of signals.

Furthermore, according to an aspect of the invention the third status indicates that the algorithm is close to being ready for acquiring a signal of the stream of signals to account for acquisition latencies of the sensor system.

This embodiment has the particular advantage that the sampling rate of the sensor system and the acquisition rate of the algorithm can even be further synchronized because the sampling of the new signal can be completed and provided to the algorithm exactly at that time when the algorithm is capable of processing a new incoming data token.

In an embodiment of the invention the sensor system may be configured to provide information on the expected acquisition time to the processor.

Moreover, the processor is configured to read the states and to trigger the acquisition of the signal at the sensor system upon determining that the algorithm is in the third status. For this the processor uses the information on the expected acquisition time and the information on the time until the algorithm will be in the first status. By this the algorithm receives the data token precisely when the algorithm enters the first status.

In a further embodiment the processor may be configured to use the expected acquisition time to determine when the algorithm will be in the first status.

In a further embodiment the sensor system may be an image recording device, a sound recording device, a temperature recording device, a recording device for the chemical composition of the environment, a device for light detection and ranging (LIDAR), a radio detection and ranging (RADAR) device, ultrasonic sensors, and other sensors relevant for automotive applications.

In a further embodiment the sensor system may be an image recording device and the sampling rate of the image recording device is the frame rate of the image recording device.

In a further embodiment the processor of the computer system may be a central processing unit (CPU), a graphical processing unit (GPU), an application-specific integrated circuit (ASIC), field-programmable gate array (FPGA) or a combination thereof.

In a second aspect the invention relates to a computer system implemented method for acquiring the data stream of a sensor system comprising:
executing on a processor an algorithm for continuously acquiring a data stream consisting of data tokens, wherein the algorithm has an acquisition rate for acquiring the data tokens;
the processor providing instructions to the sensor system to adapt the sampling rate of the sensor system to the acquisition rate of the algorithm;
the sensor system acquiring a stream of signals from the environment at the sampling rate, thereby providing the data stream consisting of data tokens each token corresponding to an acquired signal of the stream of signals.

According to the second aspect of the invention, the algorithm has three different states, a first status indicating that the algorithm is ready to acquire a signal of the stream of signals and a second status indicating that the algorithm is not ready to acquire a signal of the stream of signals.

Moreover, according to the second aspect of the invention, the third status indicates that the algorithm is close to being ready for acquiring a signal of the stream of signals to account for acquisition latencies of the sensor system.

Furthermore, according to the second aspect of the invention, the sensor system provides information of the expected acquisition time to the processor.

Moreover, the processor reads the states and triggers the acquisition of the signal at the sensor system upon determining that the algorithm is in the third status. For this the processor uses the information on the expected acquisition time and the information on a time until the algorithm will be in the first status. By this the algorithm receives the data token precisely when the algorithm enters the first status.

DETAILED DESCRIPTION OF THE INVENTION

Figure 1:
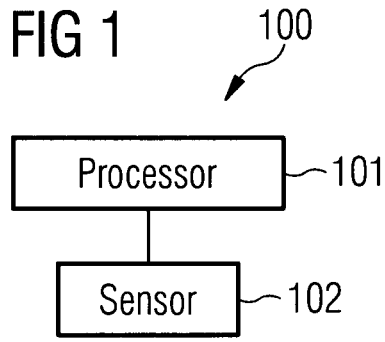
FIG. 1 illustrates a computer system comprising a processor and a sensor system.

FIG. 1 shows a computer system 100 comprising a processor 101 and a sensor system 102. The processor 101 and the sensor system 102 can be provided within the same casing or can be provided in separated casings. The processor 101 and the sensor system 102 can be operably linked by any connection suitable to transfer data between the processor 101 and the sensor, like a data cable (e.g a local area network or a data bus, e.g. a USB bus) or a wireless connection (e.g. a Wifi network or Bluetooth). The computer system 100 may comprise or/and be operably connected to a memory device for storing the data output by the processor 101 or the sensor system 102. The computer system 100 may comprise as the processor 101 a central processing unit, a graphical processing unit, an application-specific integrated circuit (ASIC), field-programmable gate array (FPGA) or a combination thereof.

Figure 2:
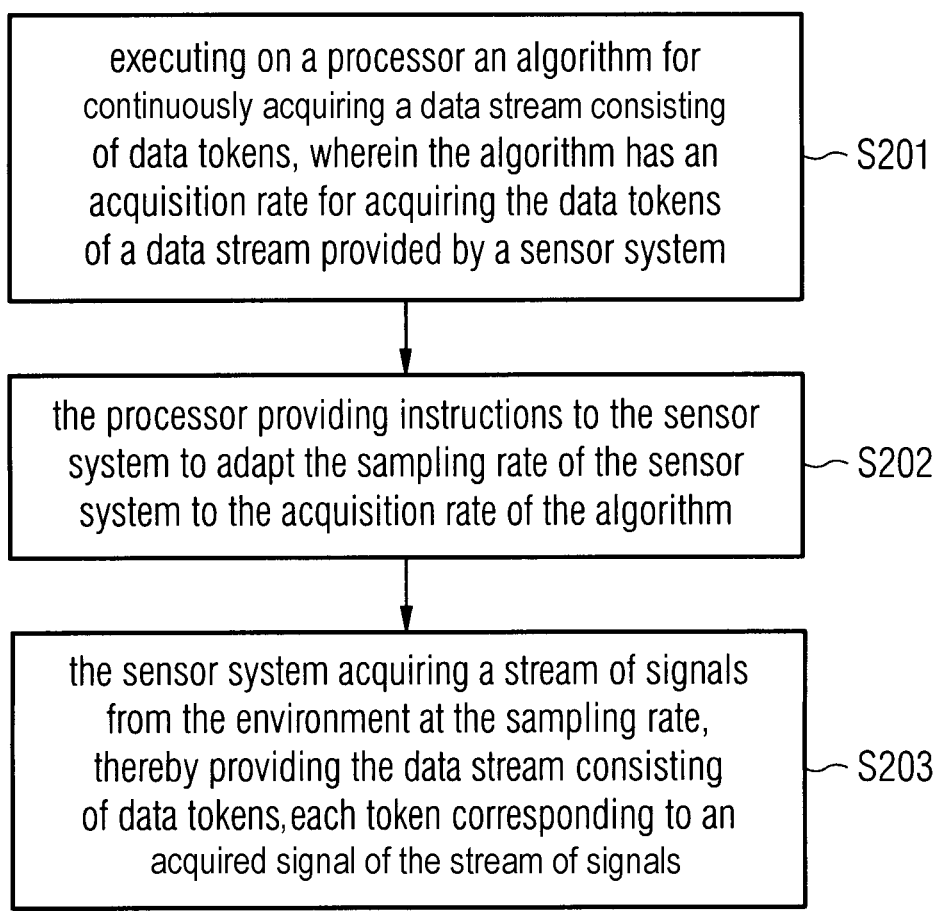
FIG. 2 illustrates a method for algorithm trigged sensor data acquisition.

As depicted in FIG. 2 the processor 101 executes the algorithm that acquires the data stream provided by the sensor system 102 (S201). The sensor system 102 is a device that preferably is capable of transforming an analogue signal provided by the environment into a digital signal. The sensor system 102 acquires the analogue signal at a particular sampling rate, providing for each sampling of the analogue input a discrete digital data package (data token) after conversion. For this purpose the sensor system 102 comprises a device for converting an analogue signal to a digital signal (e.g. an optoelectronic sensor in the case of a digital camera).

Each sampling step can endure for a specific time length that is adjustable by the user, is predetermined, or is automatically determined in dependency from external factors. For example, for a digital camera the time length of the sampling step can depend from the light level in the environment of the sensor. The length of the time length of the sampling step determines the maximum sampling rate, with the maximum sampling rate being a time period divided by the length of the sampling step.

Accordingly, the computer system 100 or the sensor system 102 may also be configured to determine the level of such an external factor. This can be achieved by the device for converting an analogue signal to a digital signal of the sensor system 102 itself or by an additional sensor system 102 that is capable of determining a digital value for the external factor.

Returning to the algorithm, the algorithm is a computer program for processing the data stream comprising the data tokens received by the sensor system 102. The data stream contains the raw data provided by the sensor system 102. This raw data can be processed by the algorithm into a different (for example, a compressed) format that is different from the format of the raw data, for example, a format requiring a lower amount of bits.

The algorithm processes the data stream continuously and sequentially (data token by data token) and thus the algorithm has a certain acquisition rate for processing new incoming data tokens of the data streams. This acquisition rate can depend from various factors. For example, the code of the algorithm may require that each data token is submitted to particular processing steps each requiring a certain amount of time. Thus, during the time one incoming data token is processed the algorithm is not capable of processing a further incoming data token. This code specific limitation of the algorithm may further be dependent on the processing time that is allocated to the algorithm by the processor 101 on which the algorithm is executed. For example, if a further process, that is not the algorithm for acquiring the incoming data stream, is executed on the same processor 101, the processor 101 may reduce the maximal processing time allocated to the algorithm for acquiring the incoming data stream.

In addition, the processor 101 will inherently have a certain maximal processing speed that may also limit the rate at which the execution of the algorithm for acquiring the incoming data stream is performed.

Therefore, the algorithm may have a status where it is ready to acquire a new incoming data token and a status where it is not ready to acquire a new incoming data token. This status information may be provided by the algorithm itself or by a further process being executed on the processor 101 which determines the status of the algorithm.

The processor 101 can read these states and upon determining that the algorithm is ready sends instructions to the sensor system 102 to acquire a signal from the environment S202, thereby triggering the acquisition of a new signal by the sensor system 102, and to provide a new data token after digital conversion of the signal S203. Preferably, the processor 101 triggers the acquisition of the signal at the sensor system 102 upon determining that the algorithm is in the third status. The reading of those states by the processor 101 especially occurs in a recursive way and depending on the status of the algorithm the acquisition of a new signal by the sensor system 102 is either triggered or not. The algorithm is hereby preferably processing the incoming data tokens continuously.

This approach has the advantage that no data token is send to the algorithm executed on the processor 101 when the algorithm is not ready. In this way the sampling rate of the sensor system 102 is no longer at a predetermined fixed value, but can vary depending on the instructions send by the processor 100 and is thus adapted to the acquisition rate of the algorithm. In this way no processing time is wasted and no additional memory is required to provide a preliminary storage place for the incoming data stream.

The first status which indicates that the algorithm is ready may also indicate that the algorithm is close to being ready for acquiring a signal of the stream of signals. This may also be considered to represent a third status and this third status may also be accompanied with information about the time period until the algorithm may be ready. This has the advantage that acquisition latencies of the sensor system 102 can be accounted for. For example, the processor 101 may be provided with the information that the acquisition of a further signal and the conversion of this signal into a data token may take a period $t_A$ (signal acquisition period). A process executed on the processor 101 may read that the algorithm is in a third status and the processor 100 may be provided with the information that the algorithm may be ready in a period of $t_R$ (period until algorithm is ready). Then it can be calculated by the process executed on the processor 101 that after a period $t_r=t_R-t_A$ ("period until triggering is executed") the algorithm will be in the first state and thus trigger the acquisition of the signal at the sensor system 102 after expiry of the period $t_r$. To ensure that the various events of the claimed method and within the claimed system are synchronized, the computer system 100 can also comprise a clock structure for synchronizing the processes being executed in the computer system 100.

As discussed above, the acquisition latencies may also depend from the determination of an external factor (e.g. the level of light in the case of an optical sensor) and thus may be accounted for when determining the presence of a third status.

The disclosed sensor system 102 may be any sensor system 102 that is capable of sequentially and also continuously acquiring an external (e.g. analogue) signal from the environment and converting this signal into a digital data stream consisting of data tokens. Thus, the sensor system 102 may be an image recording device, a sound recording device, a temperature recording device, or a recording device for the chemical composition of the environment. An image recording device may be a digital camera or digital video camera. The image recording device may comprise a charge-coupled device (CCD) sensor or a complementary metal-oxide-semiconductor (CMOS). A temperature recording device may measure the resistance in a metal in a temperature dependent manner (thermistor, e.g. Positive or Negative Temperature Coefficient Thermistor) and comprise means to convert these measurements into a digital data stream. A sound recording device may be any form of microphone suitable for measuring sound waves and converting them into a digital signal. A recording device for the chemical composition of the environment may be for example a pH meter or a potentiometer, or any other device suitable to measure in a time dependent manner a chemical factor in the environment.

The herein disclosed computer system 100 may have a number of applications.

It may be comprised in any form of vehicle, e.g. in an automobile (e.g. a car or a truck), an aircraft or a ship. It may be comprised in and/or operably connected to an Advanced Driver Assistance System (ADAS) which may be comprised in any form of vehicle as described above. Particularly preferred is the use of a computer system 100 comprising an image recording device that is used as a front, side, or rear camera in an automobile.

The invention claimed is:

1. A computer system for a vehicle comprising:
a sensor system of the vehicle configured to acquire a stream of signals from an environment at a sampling rate thereby providing a data stream consisting of data tokens each token corresponding to an acquired signal of the stream of signals; and
a processor of the vehicle configured to execute an algorithm for continuously acquiring the data stream consisting of data tokens, wherein the algorithm has an acquisition rate for acquiring the data tokens of the data stream;
wherein the processor of the vehicle is configured to provide instructions to the sensor system of the vehicle to adapt the sampling rate to the acquisition rate of the algorithm,
wherein the algorithm has three different states, a first status indicating that the algorithm is ready to acquire a signal of the stream of signals, a second status indicating that the algorithm is not ready to acquire a signal of the stream of signals, and a third status indicating that the algorithm is ready for acquiring a signal of the stream of signals after a time period $t_r$ has elapsed to account for acquisition latencies of the sensor system,
wherein the sensor system of the vehicle is configured to provide information to the processor on an expected acquisition time $t_a$, the acquisition time $t_a$ indicating a time required for the sensor to acquire the signal and produce a data token based on the acquired signal,
wherein the algorithm is configured to provide information to the processor of the vehicle on a ready time when the algorithm will transition from the third status to the first status, and
wherein the processor of the vehicle is configured to read the states and to trigger the acquisition of the signal at the sensor system based on a time difference $t_r$–ta when the algorithm is in the third status, such that the algorithm receives the data token when the algorithm enters the first status.

2. The computer system according to claim 1, wherein the sensor system comprises at least one of an image recording device, a sound recording device, a temperature recording device, a recording device for the chemical composition of the environment, a device for light detection and ranging (LIDAR), a radio detection and ranging (RADAR) device, ultrasonic sensors, and other sensors relevant for automotive applications.

3. The computer system according to claim 1, wherein the sensor system is an image recording device and the sampling rate of the image recording device is the frame rate of the image recording device.

4. The computer system according to claim 1, wherein the processor of the computer system is a central processing unit (CPU), a graphical processing unit (GPU), an application-specific integrated circuit (ASIC), field-programmable gate array (FPGA) or a combination thereof.

5. A method for a vehicle for acquiring a data stream of a sensor system, the method comprising:
executing, by a processor of the vehicle, an algorithm for continuously acquiring a data stream consisting of data tokens, wherein the algorithm has an acquisition rate for acquiring the data tokens;
providing, by the processor of the vehicle, instructions to the sensor system to adapt the sampling rate of the sensor system to the acquisition rate of the algorithm;
acquiring, by the sensor system of the vehicle, a stream of signals from an environment at the sampling rate, thereby providing the data stream consisting of data tokens each token corresponding to an acquired signal of the stream of signals,
wherein the algorithm has three different states, a first status indicating that the algorithm is ready to acquire a signal of the stream of signals, a second status indicating that the algorithm is not ready to acquire a signal of the stream of signals, and a third status indicating that the algorithm is ready for acquiring a signal of the stream of signals after a time period $t_r$ has elapsed to account for acquisition latencies of the sensor system;

providing, by the sensor system of the vehicle, information to the processor of an expected acquisition time $t_a$, the acquisition time $t_a$ indicating a time required for the sensor system to acquire the signal and produce a data token based on the acquired signal, wherein information on a ready time when the algorithm will transition from the third status to the first status is provided to the processor; and reading, by the processor of the vehicle, the states and to trigger the acquisition of the signal at the sensor system based on a time difference $t_r - t_a$ when the algorithm is in the third status, such that the algorithm receives the data token when the algorithm enters the first status.

\* \* \* \* \*